United States Patent [19]
Rossi

[11] 4,442,335
[45] Apr. 10, 1984

[54] SIDE APERTURE WELDING ASSEMBLY SYSTEM

[75] Inventor: Cristiano Rossi, Birmingham, Mich.

[73] Assignee: Comau S.p.A., Turin, Italy

[21] Appl. No.: 385,514

[22] Filed: Jun. 7, 1982

Related U.S. Application Data

[63] Continuation of Ser. No. 363,897, Mar. 31, 1982, abandoned.

[51] Int. Cl.³ .......................... B23K 9/12; B23K 37/00
[52] U.S. Cl. ........................................ 219/79; 219/80; 219/86.24; 228/4.1
[58] Field of Search ............... 219/79, 80, 86.24, 86.7, 219/158; 228/47, 4.1; 29/430

[56] References Cited

U.S. PATENT DOCUMENTS

| | | | |
|---|---|---|---|
| 2,779,092 | 1/1957 | Gordon | 29/430 |
| 4,160,147 | 7/1979 | Matsubara et al. | 219/80 |
| 4,162,387 | 7/1979 | De Candia | 219/79 |
| 4,256,947 | 3/1981 | De Candia | 219/79 |
| 4,392,601 | 7/1983 | Fujikawa et al. | 228/4.1 |

FOREIGN PATENT DOCUMENTS

| | | | |
|---|---|---|---|
| 2428841 | 1/1975 | Fed. Rep. of Germany | 228/47 |
| 2350603 | 4/1975 | Fed. Rep. of Germany | 228/47 |
| 2810822 | 9/1978 | Fed. Rep. of Germany | 228/47 |

*Primary Examiner*—B. A. Reynolds
*Assistant Examiner*—Catherine M. Sigda

[57] ABSTRACT

A car body side aperture assembly system for welding together multiple component parts of side apertures for different vehicle bodies at successive framing and respot welding stations. Overhead conveyor carriers each with laterally spaced racks for supporting loosely mounted component parts for left and right side apertures move into station position over selectively positioned framing station fixtures for accurately locating the component parts in required relation. Programmable robot welders produce different pretack welds at successive framing stations as well as respot welds at intermediate stations as required for different side apertures. The system includes means for selectively shuttling framing station pallets each with outwardly expandable fixtures having tooling for locating the multiple component parts of a particular side aperture at each framing station. Side aperture components exposed outwardly of both carrier and locating fixture provide optimum flexibility and accessability for robot welders located on either side of the framing station.

11 Claims, 5 Drawing Figures

SIDE APERTURE WELDING ASSEMBLY SYSTEM

This application is a substitute continuation of co-pending application Ser. No. 363,897 filed on Mar. 31, 1982, now abandoned.

BACKGROUND OF THE INVENTION

In U.S. Pat. No. 4,256,947 issued on Mar. 17, 1981, a body assembly system is disclosed for car body side apertures wherein a progression of central carriers suspended from a monorail with side aperture component parts loaded on either side move into successive framing stations in each of which pivotally suspended side gates swing inwardly into locating and clamping relationship for accurately orienting and holding the respective parts while welded by programmable robot welders. Reciprocable side gates are provided to accommodate side apertures for different body styles automatically differentially welded under appropriate programs for the robot welders.

SUMMARY OF THE INVENTION

The present invention is an improvement wherein the prior art suspended reciprocable gates which swing inwardly from the outside at a framing station to locate components of a pair of side apertures on an inside carrier are replaced by central outwardly expandable side gates on floor mounted frames which are overriddened by an open A-frame carrier loaded with loosely oriented side aperture components on either side. A plurality of alternative inside locating side gates are shuttled on a floor rail system with means for positioning the appropriate pair at the framing station in preparation for the arrival of an overhead A-frame carrier and are thereupon expanded laterally into locating relation with the side aperture components preferably loaded with exterior surfaces facing inwardly. Suitable clamping on the gate fixture is actuated to accurately hold respective components of each side aperture for preliminary tack welding at the framing station by programmable robot welders which in a typical case may include two robot welders on either side.

The relative advantages of this newer system include greater flexibility and accessability for the robot welding heads at the framing station, fewer stations with less requirement for respot welding, and a basic saving in structural installation.

The system is adaptable to include a series of framing stations with intermediate respot and loading stations for adding additional component parts to any extent required for complex multiple part side apertures; also for parallel framing stations to accommodate numerous different side aperture body styles exceeding the practical limit for shuttling gates at a single framing station at the beginning or any intermediate location in the assembly line; or in order to achieve balanced optimized total line capacity, for example where welding operations at certain framing station involves relatively longer total cycle time than at the other station; also to achieve redundancy where interruptions requiring service are anticipated at individual framing stations.

Return of the carriers may be achieved in a continuous loop or by an elevator system for upper level return. Self-propelled electrically powered trolleys are preferred which have rapid traverse and slow speeds automatically controlled by proximity limit switches at the respective stations.

BRIEF DESCRIPTION OF THE DRAWINGS

With reference to FIG. 1 a typical side aperture framing station includes floor mounted track assembly 10 for three pallet mounted side gate assemblies A, B and C (C being omitted for clarity) connected by couplings 11 and mounted on track rollers 12 for reciprocation through floor mounted fast and slow speed drive motor 13, drive shaft 14, pinion 15 and rack 16 extending under guide rollers 17. A pair of side gates 18, each mounted on triangular frame 19, are laterally movable on a pair of slides 20 on transverse pallet ways 21 when the pallet arrives at the framing station, as illustrated by the B unit, through engagement of a pair of depending drive projections 22 which move into station position between drive jaws 23 on cross slide 24 piloted on fixed transverse rods 25. Respective cross slides 24 are driven in opposite directions by a single oppositely threaded feed screw 26 actuated by a fixed floor mounted fast and slow speed motor and belt drive assembly 27. The side gates are thus laterally movable from the contracted position shown for overpassing by side aperture carrier 28, shown with portions broken away in FIG. 1, to an expanded fixed stop side aperture locating position relative to side aperture components such as 29, 30, 31 and 32 shown in FIG. 2 loosely supported on hangers 33, 34, 35 and 36. Parts are clamped in accurately oriented position by suitable power clamps on the side gates.

Figure 1:
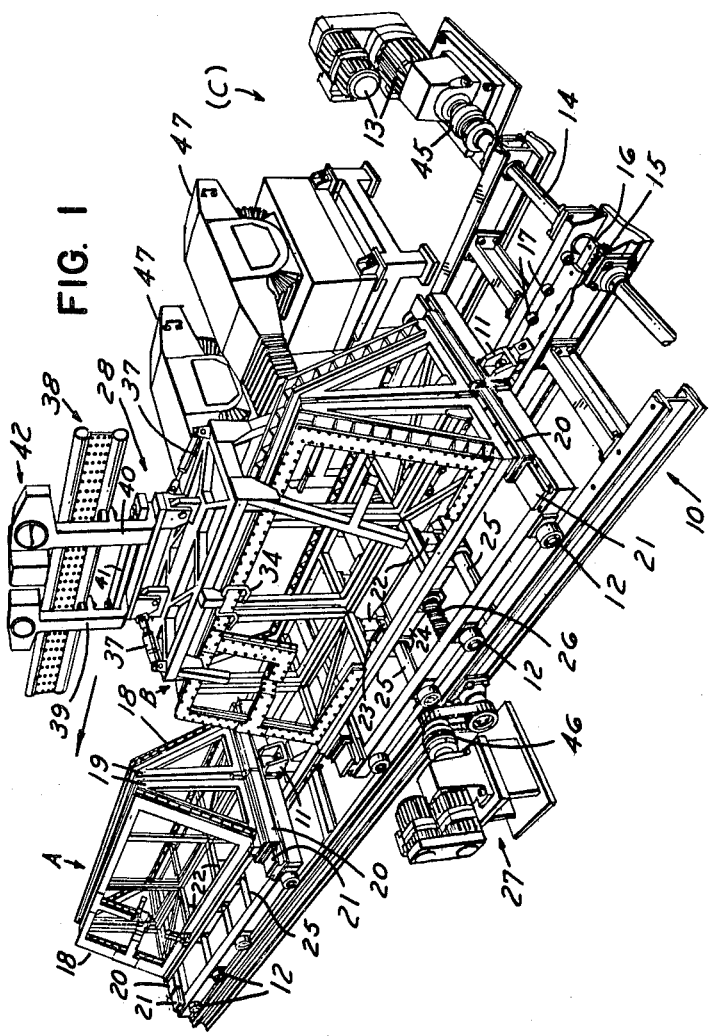
FIG. 1 is a fragmentary perspective view of a typical framing station with a fragmentary portion of a carrier shown in place.

Side aperture carriers 28, each suspended on monorail 38 by a pair of hangers 39, 40 connected by spacer bar 41, are individually self-propelled by two-speed motor drive 42 for fast transport up to 160 feet per minute between stations slowing down to 40 feet per minute or less through engagement of a proximity limit switch near the station, a second limit switch serving to apply a motor brake which stops the carrier within sufficient accuracy as to render unnecessary a fixed stop for longitudinal location. Stability against lateral oscillation is provided by angularly mounted shock absorbers 37.

Fixed stop means are employed for longitudinal location of the A, B, or C roller supported pallet in which position depending projections 22 enter within transverse slide mounted jaws 23 as previously described.

Fast and slow speed motors for use in both shuttle transfer of pallets and transverse positioning of side gates at the framing station may be duplicated with standby motor units on opposite sides which can be clutched as alternative drives for shafts 14 and 26 upon declutching at 45 and 46.

Programmable robot welders 47 located on either side of the station, only two of which are shown, serve to pretack side aperture components into accurately oriented integral relation whereupon release of the clamps and retraction of the side gates permits monorail transport to respot and subsequent framing stations where additional side aperture component parts may be added in accurately located relation for further pretack welding as at the framing station already described.

It will be understood that through employment of this side aperture welding system components are located on the outside of both carrier and locating gates so that improved and maximum accessability to the robot welding heads is achieved at each framing station as compared to the system disclosed in U.S. Pat. No. 4,256,947 where locating gate structure is interposed between the side aperture components and the robot welding heads. In addition, it will be seen that solid direct floor structure support for the reciprocating gate structure simplifies and provides a basic saving in structural installation relative to overhead support for reciprocating swinging gates as disclosed in said prior patent. Rigid stability of the gate structure is achieved through the triangular shape of the gate frames.

DESCRIPTION OF TYPICAL SYSTEM INSTALLATION

Figure 2:
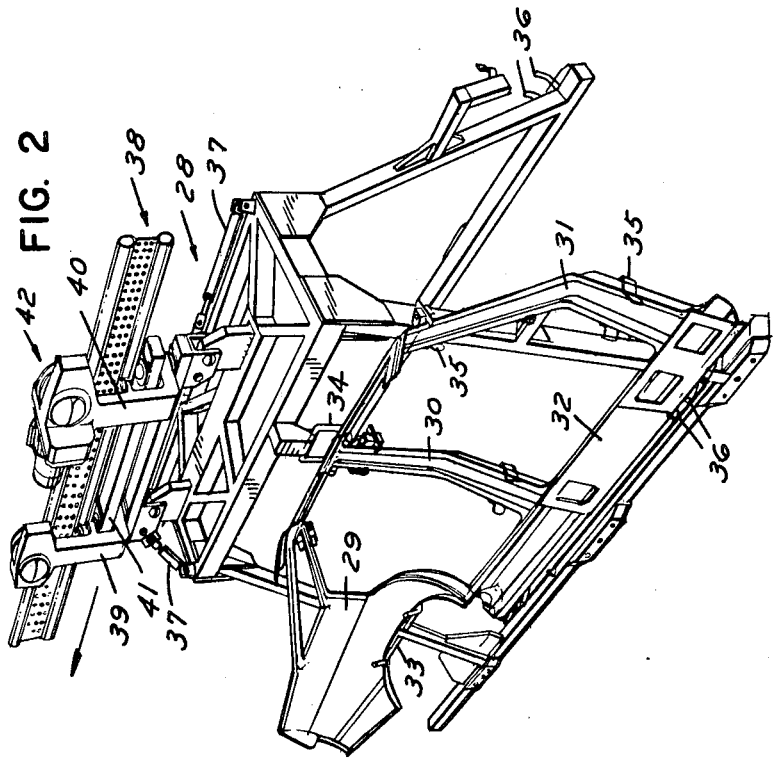
FIG. 2 is a perspective view of a carrier for component parts of a pair of side apertures.
Figure 3:
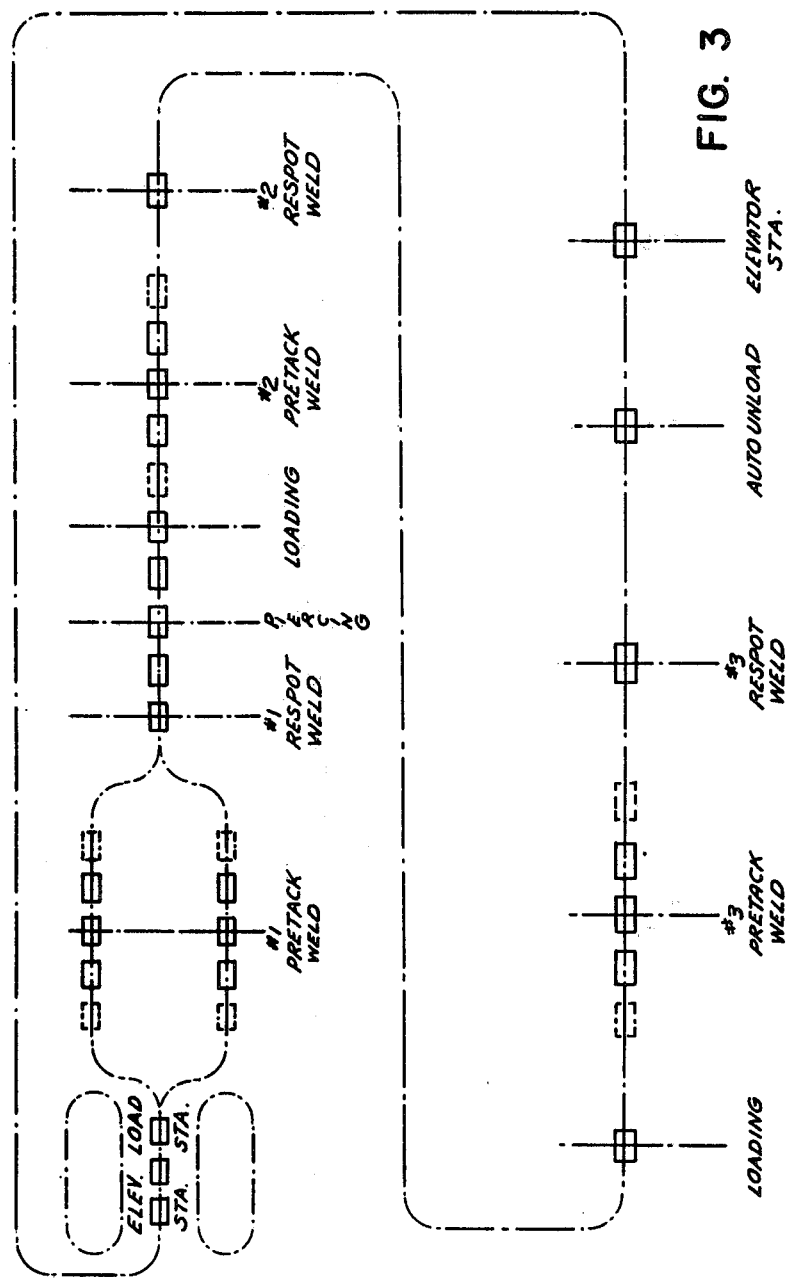
FIG. 3 is a schematic layout of a typical complete side aperture welding system employing the present invention.

While only a single framing station and carrier constructed in accordance with the present invention have been illustrated in FIGS. 1 and 2, it will be understood with reference to FIG. 3, as previously mentioned, that in a typical complete system a plurality of parallel as well as sequential framing stations may be employed with intervening respot welding and special stations for performing operations which do not require accurate gate location of additional component parts. Thus, while three tandem pairs of gates with reciprocable shuttle transfer to a single framing station provide an optimum accommodation for three alternative side aperture body styles, a parallel framing station may increase the capacity to five or six body styles which may be serviced by a single line of sequential respot and supplemental framing stations. Parallel framing stations may likewise be employed to balance the line where a relatively large number of welds involve a cycle time substantially longer than other stations along the line; or to provide redundancy where one of a pair of parallel framing stations is down for servicing whereupon the other may continue to provide at least partial uninterrupted production.

As a specific example of a complete system designed to accommodate side apertures for five different car body styles including both two-door and four-door side apertures, a single load station may be serviced on either side by manual operators who are each supplied with the four initial side aperture components 29, 30, 31 and 32 illustrated in FIG. 2 from auxiliary preload carriers which travel on separate overhead loop conveyors on either side of the load station and which are preloaded by separate operators from storage facilities for each of the five body styles. Parts from preloaded carriers are manually transferred to a side aperture carrier such as illustrated in FIG. 2 at the load station where the overhead track leads through switches to alternative tracks extending through the parallel framing stations where first stage pretacking of 25 spot welds is performed on both right and left hand side apertures by a pair of robot welders on either side of each framing station.

The parallel tracks rejoin a single track which extends through a first stage respot station where the carrier stops without requirement for precision gate location for the performance of 26 first stage respot welds for right and left hand side apertures by three programmable spot welders on either side. Each carrier next stops at a special operating station for piercing previously welded components again without need for accurate gate positioning. The carrier next stops at a second manual loading station where a pair of operators on either side manually load and toy tab seven additional components followed by carrier movement to a single second stage pretack station where 23 spot welds are performed on any of the five body styles with only three shuttling gate pallets and two pairs of programmable robot welders since, at this second stage, there is sufficient commonality of added components that three alternative gate systems are sufficient.

The carrier next moves to a second stage respot station where twenty-four spot welds are performed by a single robot welder on either side. At the next station manual loading of two additional components is performed followed by third stage pretack station similar to the second stage where three shuttling gate pallets are serviced by a pair of robot welders on either side. Finally, at a third stage respot station, twenty-nine spot welds are performed on right and left hand side apertures by three robot welders on either side. Each carrier next proceeds to an automatic unload station and then to an elevator station where it is raised to a return track at an upper level to an elevator station which lowers to the original track level leading to an idle station and to the originally described load station.

In this particular case a single side aperture carrier was found adequate for loosely loaded components of all five side aperture body styles notwithstanding the need for five different side gate systems at the first stage pretacking operation. By employing known limit switch controls for starting and stopping the individual self-propelled overhead conveyors, cueing in advance of any station is provided until the station operation is completed and the preceding carrier is discharged. By utilizing sufficient carriers in the total system to feed the first loading station without delay, and with two carrier speeds of 160 and 40 feet per minute, a production capacity of 94 completely welded right and left hand side apertures per hour at 100% efficiency has been attained with only manual operators servicing the line.

ALTERNATIVE EMBODIMENTS

The foregoing disclosure of a preferred embodiment employs a rigid carrier having laterally spaced sides for supporting side aperture components adapted to overpass a pair of laterally expandable side gates at a framing station to engage, locate and clamp the component parts for robot welding. This provides maximum flexibility and improved accessability of the side aperture components for the welding operations as compared to the prior system of U.S. Pat. No. 4,256,947 where locating side gates are interposed between the robot welders and the side aperture components. Such advantages of the present improvement are primarily due to locating both carrier and gate support and locating surfaces inside of the side aperture components, and providing required location and clamping through relative closure of the spacing between carrier and gates required to accommodate entry and exit of the carrier.

Figure 4:
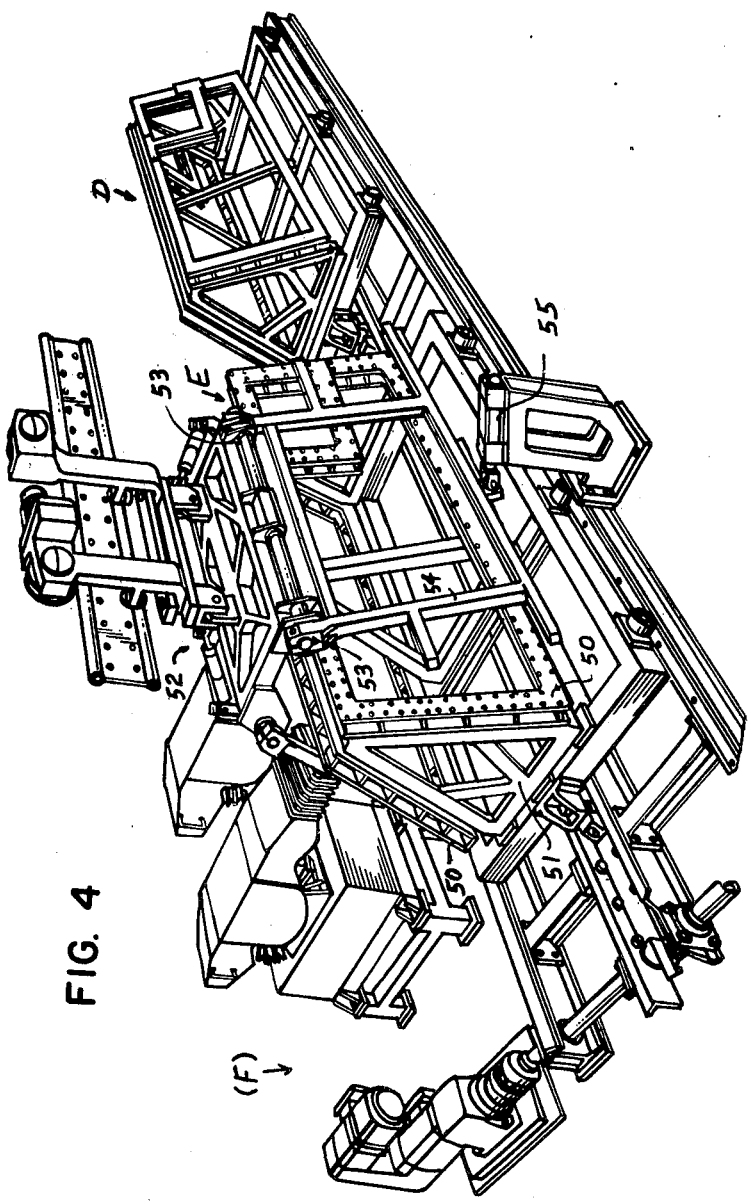
FIG. 4 is a perspective view similar to FIG. 1 illustrating a modified construction for a framing station with carrier in place.
Figure 5:
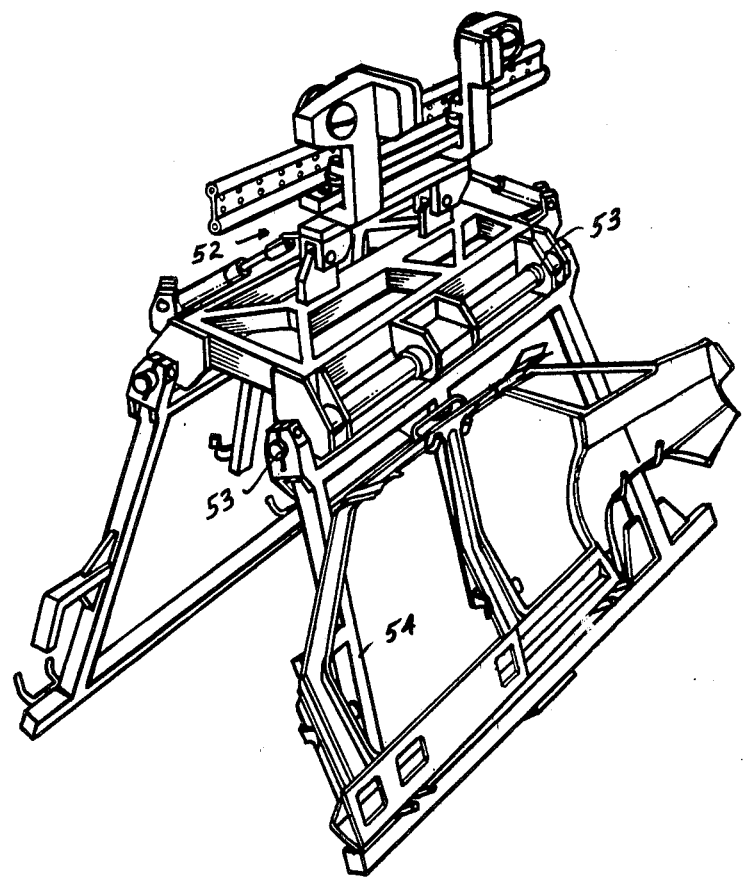
FIG. 5 is a perspective view of the carrier shown in FIG. 4 including side aperture component parts supported thereon.

Such closure, accomplished by lateral expansion of the gates in the preferred embodiment, may be accomplished in alternative ways; e.g. in the system illustrated in FIGS. 4 and 5 employing laterally fixed gates 50 mounted on a single A-frame 51 for each of the three pallet mounted side gate assemblies D, E, and F (F being omitted for clarity) and having carriers 52 with pivotal mountings at 53 for side aperture hangers 54 spring loaded to an open position for entering the station over the fixed gates 50 and for closure by power cylinder 55 upon reaching framing station position. With such alternative the added complexity of pivoted carrier construction would be offset to some extent by simplified framing station pallet and side gate construction.

As another alternative, closure between the rigid A-frame carrier of the preferred embodiment illustrated in FIG. 2 and the laterally fixed outwardly sloping side gates 50 of FIG. 4 could be effected by lowering the carrier after it has reached a station over the side gates, for example by lowering a section of the track 38 shown in FIG. 2 by power cylinder or other means not shown.

With any such alternative means for effecting equivalent relative closure between the carrier and station gates, the accessability to robot welders of outward positioning of side aperture components relative to both carrier and side gates would be retained as an advantageous feature.

I claim:

1. A multiple style vehicle body side aperture welding system characterized by overhead carrier means including laterally spaced side aperture support means for respectively carrying a plurality of components of left and right side apertures to be welded together in integrated relation, a framing station including alternatively positionable floor mounted fixture means for each body style extending inside between the left and right side aperture support means of said carrier means upon entering said station, means for effecting relative closing movement between said support means and said fixture means at said framing station, said fixture means having tooling for accurately locating and clamping said side aperture components for the particular body style at said station relative to each other and said station upon closing of said support means and fixture means, and selectively programmable welding means at said station for integrally joining said components in accurate relation while held by said fixture means.

2. The system of claim 1 including a plurality of longitudinally spaced floor mounted fixture means for different side aperture body styles, selective means for shuttling a particular fixture means into said framing station to accommodate a particular side aperture body style arriving on an entering carrier.

3. The system of claim 2 including floor mounted rail means for guidingly supporting said plurality of fixture means.

4. The system of claim 2 including floor mounted rail means for guidingly supporting said plurality of fixture means and rack and pinion drive means for selectively reciprocating the required fixture means into operative position at said station.

5. The system of claim 1 wherein said side aperture components are loaded on the outside of said support means with exterior surfaces facing inwardly to provide optimum exposed accessability to outside welding means at said station.

6. The system of claim 5 wherein said support means extends downwardly with outwardly sloping support surfaces to facilitate gravity assisted location and retention of said components against said support surfaces.

7. The system of claim 6 wherein said fixture means are constructed with sloping sides generally matching the sloping sides of said carrier support means.

8. The system of claim 5, 6 or 7 wherein fixture means for locating respective left and right hand side apertures are mounted on a longitudinally reciprocable pallet having transverse slide means for accommodating lateral movement of individual left and right hand fixture means to effect said closing movement.

9. The system of claim 8 including means at said station for effecting synchronized lateral closing movement of said fixture means to a side aperture locating relation with a carrier position at said station.

10. The system of claim 9 including lateral guide bar means and oppositely threaded feed screw means for effecting simultaneous lateral movement of said fixture means.

11. The system of claim 1 including parallel upstream framing stations each adapted with multiple fixture means for accommodating different side aperture body styles, and a downstream framing station including a plurality of selectively reciprocable fixture means adapted to accommodate all side aperture body styles from said parallel upstream framing stations.

* * * * *